United States Patent [19]
Tucker et al.

[11] 3,875,645
[45] Apr. 8, 1975

[54] FAIRING TOOL

[75] Inventors: Roy G. Tucker, Whitman; Russell G. Billard, Hingham, both of Mass.

[73] Assignee: General Dynamics Corporation, St. Louis, Mo.

[22] Filed: Nov. 14, 1973

[21] Appl. No.: 415,685

[52] U.S. Cl.................... 29/271; 29/263; 85/1 R; 85/9 R
[51] Int. Cl............................................ B23k 37/04
[58] Field of Search......... 29/271, 200 P; 24/211 R, 24/221; 85/1 H, 1 R, 9 R; 52/785 F

[56] References Cited
UNITED STATES PATENTS

| | | | |
|---|---|---|---|
| 1,426,098 | 8/1922 | Pruitt | 85/1 R |
| 3,300,847 | 1/1967 | Franklin et al. | 29/271 |
| 3,342,479 | 9/1967 | Howe | 29/271 |

FOREIGN PATENTS OR APPLICATIONS

| | | | |
|---|---|---|---|
| 1,236,526 | 6/1971 | United Kingdom | 85/9 R |

*Primary Examiner*—Donald G. Kelly
*Assistant Examiner*—Harold P. Smith, Jr.
*Attorney, Agent, or Firm*—Fitch, Even, Tabin & Luedeka

[57] ABSTRACT

A fairing tool for aligning plates preparatory to welding comprising a main body proportioned to span a predetermined distance between plates and having a passageway therethrough, handle means having a portion slidably disposed in the passageway and a head at the front end thereof which is narrower than the predetermined distance but when rotated 90° will span that predetermined distance. A nut engages threads on the handle means for drawing the head toward the main body and thereby forces the plate edges into planar alignment. The main body is threaded and carries a large nut which can be used to extract the tool if needed.

4 Claims, 3 Drawing Figures

FAIRING TOOL

The present invention relates generally to a plate-fairing tool and more particularly to one which is designed to force the edges of two plates into alignment with each other preparatory to creating a butt weld therebetween.

A butt weld is often made by supporting a pair of metal plates in coplanar, edge-aligned relation and then welding along the joint between the plates. When the plates are quite large, for example in respect of plates which are used for the construction of a ship hull or the like, it is difficult to maintain them in alignment preparatory to welding, it has been common practice to weld dogs to the plates for this purpose, which dogs subsequently must be burned off and the regions ground clean. Although various reusable tools have been designed for clamping plates in alignment for welding, such tools have not proved to be overly successful, particularly with respect to fairing thick, large plates, and more efficient tools have long been desired.

It is an object of the present invention to provide an improved clamping tool for fairing plates preparatory to welding. Another object is to provide a tool for clamping the edges of adjacent plates into precise alignment which tool is also designed to provide a guide controlling the spacing between the edges of the plates preparatory to making a butt weld. A further object of the invention is to provide an improved tool for clamping the edges of plates into alignment, which tool is designed to be removable from one surface of the partially welded plates and which incorporates means to assist in positively extracting the tool should a tight fit occur. These and other objects of the invention will be apparent from the following detailed description of an illustrated tool embodying various features of the invention, particularly when read in conjunction with the accompanying drawings wherein:

Figure 1:
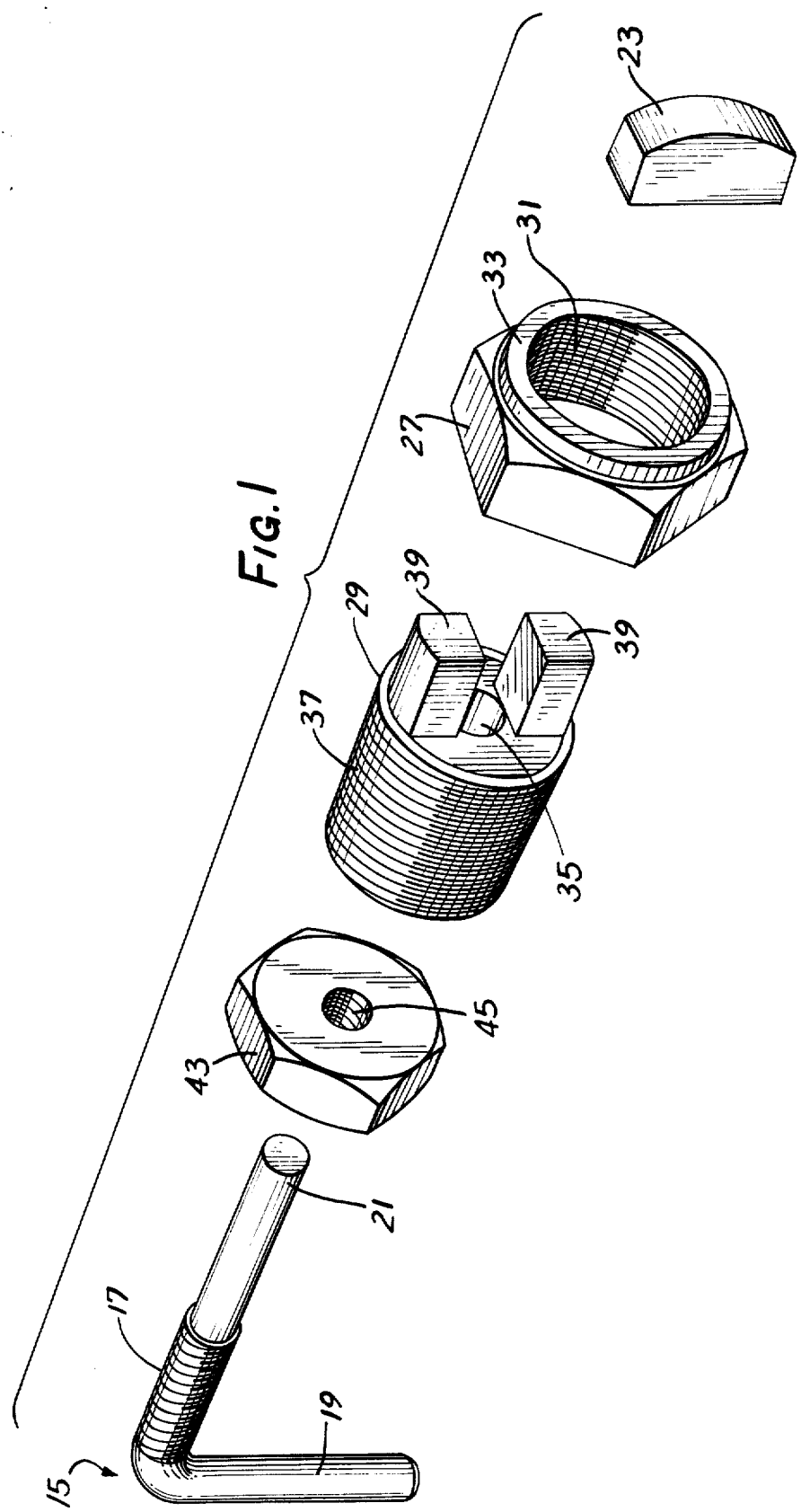
FIG. 1 is an exploded perspective view of a tool embodying various features of the invention.

Illustrated is a plate-fairing tool 11 which is designed so that it can be installed from one side of a pair of large plates 13 that are to be butt welded, which will clamp the plate edges in aligned relation to each other and which can ultimately be removed by a worker located on one side of the plate arrangement. The tool 11 is made up of a main stock 15 which may be made of circular rod stock and which has external threads 17 cut therein at a location intermediate its ends but generally adjacent the rear end thereof where a handle 19 is formed. The handle 19 may be another piece of the same rod stock welded to the threaded portion at an angle of about 90°, or a single longer piece may simply be bent as illustrated.

Figure 3:
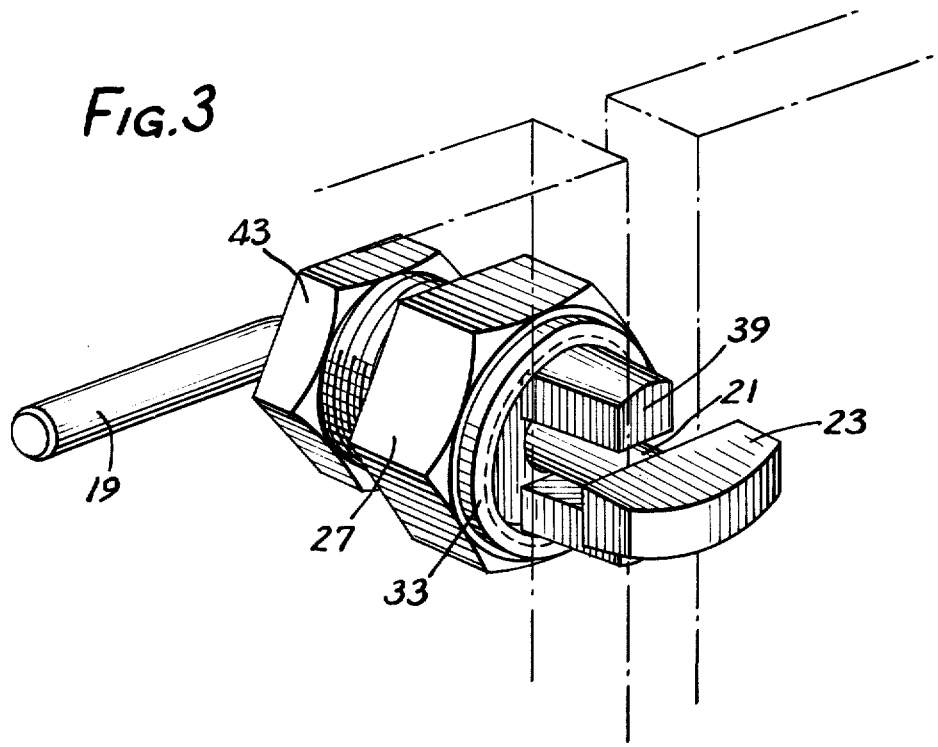
FIG. 3 is a perspective view of the tool shown clamping the edges of two plates in alignment, with the plates being shown in a phantom outline so as not to obscure the details of the tool.

The front end portion 21 of the stock carries a head 23 which is centered on the end of the stock, as best seen in FIG. 3, and which may be drilled if desired to receive the end of the rod when the head 23 is welded in position to form a Tee with the end portion 21. The head may be generally rectangular in cross section having a width just sufficiently small enough so that it can be inserted through the gap between a pair of plates spaced apart in the desired orientation to be butt welded, and having a length substantially greater than such spacing between the plates to thus bridge the furthermost surfaces of the two plates. Preferably, the head 23 is aligned with its length parallel to the length of the handle so that the operator knows that the head is pointed transverse to the length of the slot between the plates 13 when the handle is so aligned.

The tool contains a main body portion 25 which is slidably mounted on the stock 15 between the handle 19 and the head 23. The main body 25 includes an outer member 27 and an inner member 29 which are relatively movable and which, in the illustrated embodiment, are threadably interconnected. The outer member 27 has the general form of a hex nut having a very large internally threaded bore 31 extending therethrough. The front portion 33 of the outer nut 27 is reduced in size to provide a front face of circular outline which will engage the plates 13 to be aligned in sliding contact.

Figure 2:
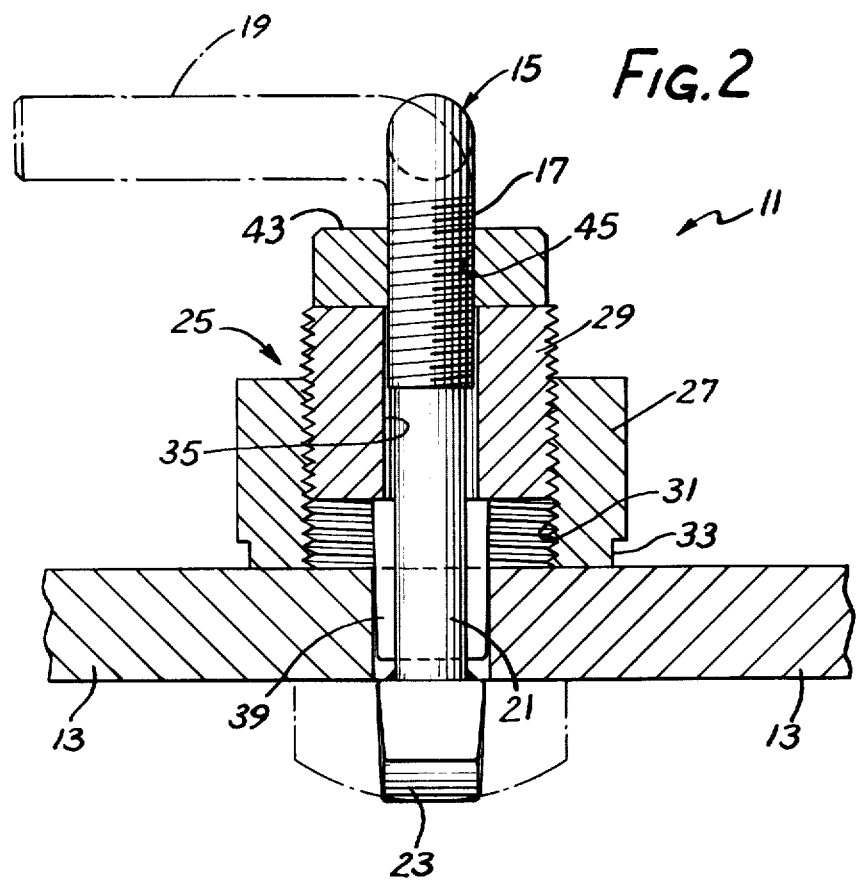
FIG. 2 is a top view, shown partially in section, illustrating the tool after it has been inserted through the gap between a pair of plates and prior to being clamped to the plates.

The inner member 29 is formed generally as a sleeve having a central circular passageway 35 which is slightly larger in diameter than the threaded portion 17 of the stock 15 and which is slidably received thereover. The outer surface of the sleeve 29 has external threads 37 cut thereon which mate with the internal threads of the large bore nut 27. The front face of the inner member is provided with a pair of tongue elements 39 which are mounted in diametrically opposed positions and which flank the end portion 21 of the stock just rearward of the front head 23. The tongue elements 39 are proportioned so that the width of these elements is just less than the desired root opening between the two plates 13 to be welded and thus the tongues serve to gauge the proper opening between the plates before the welding operation is begun, as best seen in FIG. 2.

A smaller nut 43, preferably hexagonal in outline, has internal threads 45 which mate with the threaded portion 17 of the stock at a location just forward of the handle. The nut 43 is employed to move the main body portion 25 of the tool relative to the stock 15 as explained hereinafter.

When a pair of plates 13 are in general position to be butt welded, the large bore hex nut 27 is adjusted relative to the threaded sleeve 29 so that the tongue elements 39 extend from the front end of the circular bearing face 33 of the nut a distance of about equal to two-thirds of the thickness of the plates being faired. With the handle 19 aligned parallel to the longitudinal gap between the edges of the plates 13, the worker inserts the head 23 through the opening until the head clears the opposite surface of the plates and can be rotated, bacaking-off on the smaller hex nut 43 is necessary. The handle 19 is rotated 90° once the head clears the opposite surface of the plates so that the head then bridges the two plates, and the smaller hex nut 43 is then tightened sufficiently to adjust and support the tool 11 in this position. At this point, the tongue elements 39 serve as a gauge, and if the gap between the plates 13 is greater than the desired root opening, one of the plates can be moved edgewise until the gap is closed to a distance substantially equal to the width of the tongue elements.

The hex nut 43 is then tightened using a wrench, thereby clamping the edges of both plates 13 between the head 23 and the front surface 33 of the large hex nut 27 and bringing them into precise alignment. The welding operation can then be carried to a location within a few inches of the clamping tool 11 before its removal, and removal can be quickly effected, usually without halting the welding process. In this respect, the small hex nut 43 need only be turned with a wrench in order to release the clamping tool 11, allowing the handle to be rotated 90° to align the head 23 for withdrawal through the gap between the plates 13. Should the distance between the plates edges has lessened as a result of weld shrinkage, causing the tongue elements 39 to be jammed between the facing plate edge surfaces, release of the fairing tool 11 can be quickly affected by tightening the large bore nut 27 with a wrench which forces the withdrawal of the tongue elements 39 and the head 23 from the region between the plates.

The tool 11 is extremely effective because it can be quickly inserted by a single worker operating from one side of the pair of plates 13 and subsequently removed also from the same side, without the necessity for making any manual connections on the opposite side of the plates. The tool 11 is a self-contained unit which eliminates the possible loss of parts, and it is compact and light in weight, making it easy to handle in restricted spaces. The tool not only fairs the pair of plates, but it also gauges the roots opening for the butt weld. The tool has a built in positive capability for removal in case of jamming, and it has significant and easily apparent advantages over previously employed throw-away types of fairing devices.

Although the invention has been described with respect to one illustrated embodiment, it should be understood that modifications and changes that would be obvious to one having the ordinary skill in this art may be made without departing from the scope of the invention which is defined in the appended claims.

Various of the features of the invention are set forth in the claims which follow.

What is claimed is:

1. A fairing tool for aligning plates which tool comprises
    main body means proportioned to span a predetermined distance between plates and including an externally threaded sleeve having a passageway therethrough and an internally threaded outer nut element,
    first means having a portion slibably disposed in said passageway and extending therethrough and having a head at the front end thereof which is dimensioned in one direction less than said predetermined distance so as to fit through an opening between the plates and which is dimensioned in another direction greater than said predetermined distance,
    said first means having handle means at the rear end thereof for rotating said head after its insertion through an opening between the plates so that it bridges such plates, and
    second means in contact with said first means and said main body means for moving said first means relative to said main body means whereby said head can be drawn toward said main body means to force the plate edges into planar alignment.

2. A tool in accordance with claim 1 wherein said first means include an externally threaded portion and said second means comprises a nut having mating internal threads which abuts the rear end of said main body means.

3. A tool in accordance with claim 1 wherein the front end of said sleeve carries guide means extending therefrom having a width slightly less than said predetermined distance.

4. A tool in accordance with claim 2 wherein said passageway is circular and of a diameter larger than said threaded portion of said first means.

* * * * *